United States Patent [19]

Masuda et al.

[11] 3,843,781
[45] Oct. 22, 1974

[54] SMELL-SWEETENING AND DEODORIZING MALEIMIDES

[75] Inventors: Fumiya Masuda; Meiken Nakajima, both of Ichikawa; Yukio Oyamada, Funabashi, all of Japan

[73] Assignee: Kao Soap Co., Ltd., Tokyo, Japan

[22] Filed: June 19, 1972

[21] Appl. No.: 264,266

[30] Foreign Application Priority Data
June 21, 1971 Japan.............................. 46-44726
Dec. 28, 1971 Japan.............................. 46-2775

[52] U.S. Cl................................. 424/76, 424/274
[51] Int. Cl............................................ A61l 13/00
[58] Field of Search.......................... 424/76, 274

[56] References Cited
UNITED STATES PATENTS
| | | | |
|---|---|---|---|
| 2,726,981 | 12/1955 | Wolf et al. | 424/274 |
| 3,317,372 | 5/1967 | Hart | 424/76 |
| 3,459,852 | 8/1969 | Roehm | 424/76 |
| 3,632,514 | 1/1972 | Blocker | 424/76 |
| 3,650,968 | 3/1972 | Hoffman | 424/76 |

OTHER PUBLICATIONS
Chemical Abstracts, Vol. 75, 106574d.

*Primary Examiner*—Vincent D. Turner
*Attorney, Agent, or Firm*—Woodhams, Blanchard and Flynn

[57] ABSTRACT

A smell-sweetening and deodorizing agent comprising as an active ingredient a maleimide derivative expressed by the general formula:

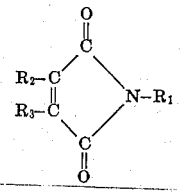

wherein $R_1$ stands for hydrogen or an organic group, and $R_2$ and $R_3$ are selected from the group consisting of hydrogen, halogen and organic groups, provided that $R_2$ and $R_3$ do not comprise parts of the same ring.

2 Claims, No Drawings

SMELL-SWEETENING AND DEODORIZING MALEIMIDES

BACKGROUND OF THE INVENTION

1. Field Of The Invention

This invention relates to a smell-sweetening and deodorizing agent which is effective for removing bad smells, especially those of mercaptans and hydrogen sulfide, in lavatories, dust bins, livestock pens, etc.

2. Description Of The Prior Art

For the deodorization of lavatories or dust bins, methods for masking odors with perfumes or the like have heretofore been mainly adopted.

Deodorizing agents capable of chemically removing bad smells, for instance, agents containing citric acid or maleic acid, as a main ingredient, have been known. These deodorizing agents are relatively effective for ammonia and amines, but they are incapable of removing the smells of mercaptans and hydrogen sulfide.

SUMMARY OF THE INVENTION

We have carried out extensive research with a view to providing a compound capable of removing bad smelling components such as mercaptans and hydrogen sulfide. We have discovered that a series of maleimide derivatives expressed by the following general formula (I):

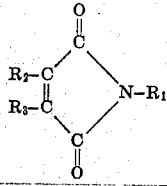

wherein $R_1$ stands for hydrogen or an organic group, and $R_2$ and $R_3$ are selected from the group consisting of hydrogen, halogen and organic groups,
are effective for the above purpose. Based on this discovery, we have achieved this invention.

Examples of organic groups represented by $R_1$, $R_2$ and $R_3$ in above general formula (I) are alkyl groups having 1-12 carbon atoms such as methyl, ethyl, n-propyl, isopropyl, n-butyl, isobutyl, pentyl, hexyl, heptyl, octyl, 2-ethyl-hexyl, nonyl, decyl, undecyl and dodecyl groups; substituted alkyl groups such as hydroxymethyl, 2-hydroxyethyl, carboxymethyl and 2-aminoethyl groups; and phenyl, alkyl substituted phenyl wherein the alkyl has 1 to 3 carbon atoms, anilino and phenylhydrazo.

Examples of maleimides expressed by the above general formula (I) are listed in Table 1.

TABLE 1

| | In Above General Formula (I) | |
|---|---|---|
| $R_1$ | $R_2$ | $R_3$ |
| H | H | H |
| H | H | $CH_3$ |
| H | H | $CH_2CH_3$ |
| H | H | $CH_2CH_2CH_3$ |
| H | $CH_3$ | $CH_3$ |
| H | $CH_3$ | $CH_2CH_3$ |
| H | H | Br |
| H | Br | Br |
| H | H | I |
| H | Cl | Cl |
| H | $CH_3$ | Br |
| $CH_3$ | Cl | Cl |
| $C_6H_5$ | Cl | Cl |

TABLE 1-Continued

| | In Above General Formula (I) | |
|---|---|---|
| $R_1$ | $R_2$ | $R_3$ |
| $C_6H_5$ | Cl | $CH_3$ |
| $C_6H_4$-$CH_3$ | H | Br |
| NH-$C_6H_5$ | I | I |
| H | $NHNHC_6H_5$ | $NHNHC_6H_5$ |
| H | H | $CH(CH_3)_2$ |
| $CH_2OH$ | H | $CH_3$ |
| $C_2H_5$ | H | H |

In this invention, the substituents $R_1$, $R_2$ and $R_3$, in general, are not critical, except that $R_2$ and $R_3$ cannot form parts of the same ring.

It has been found that the various compounds having structures similar to, but different from, that of the maleimide derivative of above general formula (I), such as N-ethyl succimide, phthalimide, N-hydroxyethyl phthalimide, N-methyl pyrrolidone, cyanuric acid, maleic acid, esters and amides thereof, fumaric acid, N-methyl butyrolactam and dimethyl succimide do not exhibit any substantial deodorizing effect for mercaptans and hydrogen sulfide. Based on this finding it has been confirmed that in order to remove mercaptans and hydrogen sulfide from a complicated putrefaction system, the presence of the characteristic maleimide grouping

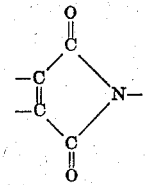

is essential. Further, it has been confirmed that a deodorizing effect cannot be obtained by compounds of general formula I in which $R_2$ and $R_3$ together form a single ring, namely compounds expressed by the following general formula (II):

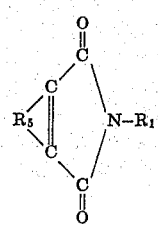

wherein $R_1$ and $R_5$ are as listed below:

| $R_1$ | $R_5$ |
|---|---|
| $CH_2OH$ | $(CH_2)_4$ |
| $CH_3$ | $(CH_2)_4$ |
| $CH_2CH_3$ | $(CH_2)_3$ |
| $C_6H_5$ | $(CH_2)_3$ |

The active ingredient of the smell-sweetening and deodorizing agent of this invention expressed by general formula I reacts with mercaptans and hydrogen sulfide and removes the bad smell thereof quite rapidly.

The use of a compound expressed by general formula I alone does not exhibit a sufficient effect for removing the odor of ammonia and amines, but when it is used in combination with known deodorizing agents for ammonia and amines, such as acids, e.g., citric acid, malic acid, oxalic acid, glycolic acid phosphoric acid, tartaric acid and maleic acid and aldehydes, e.g., glyoxal and glutaraldehyde, there can be provided a chemical deodorizing composition which exhibits deodorizing effects in a broad range of applications. An effective chemical deodorizing composition comprises from 0.1 to 5.0% by weight of a compound of formula I and from 5 to 20% by weight of said deodorizing agent for ammonia and amines. Further, in order to sterilize bad smell-giving microorganisms and to prevent bad smells from occurring anew, it is possible to incorporate in the deodorizing agent of this invention a known fungicide such, for instance, as benzalkonium chloride, alkyl pyridinium bromide, chloracetamide, phenol and cresol. The amount of said fungicide is from 0.1 to 3.0% by weight.

The smell-sweetening and deodorizing agent is generally used in the form of an aqueous solution or a water-alcohol solution, the alcohols being alkanols having 1 to 3 carbon atoms. In case the dissolution of the active ingredient is insufficient, it may be used in the form of an emulsion without any disadvantage. In some cases it may be used in a powdery or granular form. The agent can be applied, in the above-mentioned forms, to odoriferous materials and/or odoriferous objects and surfaces to remove the odor caused by hydrogen sulfide, mercaptans and like materials.

This invention will now be described in greater detail by reference to the following illustrative Examples.

Example 1

A mixture of fish meat, peptone, glucose and water was putrefied at 40°C for about 20 hours, and 1 ml of a 1% water-alcohol solution of N-ethyl maleimide (water/alcohol weight ratio = 9/1) was added dropwise to 30 g of the putrefied mixture. The amounts of mercaptan and hydrogen sulfide were determined at intervals. The excellent removal effects as shown in Table 2 were obtained.

Table 2

|  | Contents of Mercaptan and Hydrogen Sulfide | |
|---|---|---|
|  | Mercaptan (ppm) | Hydrogen Sulfide (ppm) |
| before addition | 300 | 40 |
| 1 hour after addition | 90 | 7 |
| 2 hours after addition | 45 | 0 |
| 3 hours after addition | 10 | 0 |
| 4 hours after addition | 3 | 0 |

Example 2

In the same manner as in Example 1, tests were conducted with the use of 1% water-alcohol solutions containing maleimide, N-methyl maleimide, N-nonyl maleimide, N-phenyl maleimide and 2-hydroxyethyl maleimide, respectively (water/alcohol weight ratio = 7/3). Similar results to those obtained in Example 1 were obtained.

Example 3

In the same manner as in Example 1, a test was conducted using 1 ml of an aqueous solution containing 1% of N-ethyl maleimide, 2% of glyoxal and 0.4% of benzalkonium chloride. The excellent results as shown in Table 3 were obtained.

Table 3

|  | Mercaptan Content (ppm) | Hydroegen Sulfide Content (ppm) | Ammonia Content (ppm) |
|---|---|---|---|
| before addition | 190 | 35 | 110 |
| 2 hours after addition | 5 | 0 | 15 |
| 4 hours after addition | 0 | 0 | 0 |
| 6 hours after addition | 0 | 0 | 0 |

Example 4

An aqueous solution containing 1% of N-carboxymethyl maleimide and 2% of glyoxal was tested in the same manner as in Example 1. The excellent effects shown in Table 4 were obtained.

Table 4

|  | Mercaptan Content (ppm) | Hydrogen Sulfide Content (ppm) | Ammonia Content (ppm) |
|---|---|---|---|
| before addition | 150 | 20 | 170 |
| 2 hours after addition | 13 | 0 | 0 |
| 4 hours after addition | 0 | 0 | 0 |
| 6 hours after addition | 0 | 0 | 0 |

Example 5

A mixture of fish meat, peptone, glucose and water was putrefied at 40°C for about 20 hours, and 1 ml of a 1% water-alcohol solution of 3-methyl maleimide (water/alcohol weight ratio = 8/2) was added dropwise to 30 g of the putrefied mixture. The amounts of mercaptan and hydrogen sulfide were determined at intervals. The excellent results as shown in Table 5 were obtained.

Table 5

|  | Mercaptan Content (ppm) | Hydrogen Sulfide Content (ppm) |
|---|---|---|
| before addition | 270 | 45 |
| 1 hour after addition | 70 | 10 |
| 2 hours after addition | 40 | 0 |
| 3 hours after addition | 12 | 0 |
| 4 hours after addition | 2 | 0 |

Example 6

In the same manner as in Example 1, tests were conducted using 1% water-alcohol solutions containing 5-ethyl maleimide, 3,4-dimethyl maleimide, 3-bromomaleimide, 3-bromo-4-chloromaleimide, N-methyl-3,4-dichloromaleimide and N-phenylmethyl-chloromaleimide, respectively (water/alcohol weight ratio = 7/3). Similar results to those obtained in Example 1 were obtained.

Example 7

In the same manner as in Example 1, a test was effected using 1 ml of an aqueous solution containing 1% of 3-methyl maleimide, 2% of glyoxal and 0.4% of benzalkonium chloride. The results obtained were excellent as shown in Table 6.

Table 6

| | Mercaptan Content (ppm) | Hydrogen Sulfide Content (ppm) | Ammonia Content (ppm) |
|---|---|---|---|
| before addition | 210 | 40 | 120 |
| 1 hour after addition | 55 | 8 | 50 |
| 2 hours after addition | 30 | 0 | 15 |
| 3 hours after addition | 7 | 0 | 2 |
| 4 hours after addition | 1 | 0 | 0 |

Example 8

2 ml of an aqueous solution containing 0.5% of N-hydroxymethyl maleimide, 3% of malic acid, 3% of phosphoric acid and 1.5% of glyoxal was added to a bad-smelling system comprising 100 g of putrefied excrements put in a 1 litre bottle and the amounts of mercaptan, hydrogen sulfide and ammonia in the head space of the bottle were determined at intervals. The excellent deodorizing effects as shown in Table 7 were obtained. Further, a remarkable deodorizing effect was also recognized by the judgement through the olfactory sensation.

Table 7

| | Mercaptan Content ppm | Hydrogen Sulfide Content (ppm) | Ammonia Content (ppm) |
|---|---|---|---|
| before addition | 30 | 45 | 180 |
| 1 hour after addition | 3 (30) | 5 (40) | 50 (200) |
| 3 hours after addition | 0 (35) | 0 (30) | 10 (220) |
| 5 hours after addition | 0 (35) | 0 (30) | 5 (250) |
| 20 hours after addition | 0 (30) | 0 (10) | 10 (200) |

The values in parenthesis show corresponding data in case of non-addition of deodorizing agent.

The embodiments of the invention in which an exclusive property or privilege is claimed are defined as follows:

1. A method for deodorizing and sweetening the smell of odoriferous materials and objects characterized by having mercaptans and hydrogen sulfide as a bad-smelling component, which comprises applying to said material or object an effective deodorizing amount of a compound of the formula:

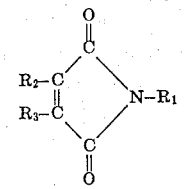

wherein $R_1$ is selected from the group consisting of hydrogen, alkyl, having one to 12 carbon atoms, hydroxymethyl, 2-hydroxyethyl, carboxymethyl, 2-aminoethyl, phenyl, alkyl substituted phenyl wherein the alkyl has one to three carbon atoms, anilino and phenylhydrazo;

$R_2$ and $R_3$ each is selected from the group consisting of hydrogen, halogen, alkyl having one to 12 carbon atoms, hydroxymethyl, 2-hydroxyethyl, carboxymethyl, 2-aminoethyl, phenyl, alkyl substituted phenyl wherein the alkyl has one to three carbon atoms, anilino and phenylhydrazo;

in an amount sufficient to substantially reduce the mercaptan and hydrogen sulfide content of the odoriferous material or object.

2. The method according to claim 1, wherein said applying is accomplished by dissolving or suspending said deodorizing compound in water or a mixture of water and an alkanol having one to three carbon atoms, and applying the dissolved or suspended compound to the odoriferous material or object.

* * * * *